United States Patent
Okochi

(10) Patent No.: US 7,117,853 B2
(45) Date of Patent: Oct. 10, 2006

(54) FUEL INJECTION CONTROLLER OF ENGINE

(75) Inventor: Yasuhiro Okochi, Nagoya (JP)

(73) Assignee: Denso Corporation, (JP)

( * ) Notice: Subject to any disclaimer, the term of this patent is extended or adjusted under 35 U.S.C. 154(b) by 0 days.

(21) Appl. No.: 11/194,579

(22) Filed: Aug. 2, 2005

(65) Prior Publication Data

US 2006/0027215 A1 Feb. 9, 2006

(30) Foreign Application Priority Data

Aug. 3, 2004 (JP) ............................. 2004-227042
Apr. 18, 2005 (JP) ............................. 2005-119812

(51) Int. Cl.
*F02M 51/00* (2006.01)
*F02B 77/08* (2006.01)
*F02D 17/00* (2006.01)
*F02D 41/10* (2006.01)
*F02D 41/12* (2006.01)

(52) U.S. Cl. ................ 123/492; 123/493; 123/198 DB
(58) Field of Classification Search ................ 123/325, 123/198 DB, 198 F, 481, 492, 493; 701/103, 701/104, 105, 112
See application file for complete search history.

(56) References Cited

U.S. PATENT DOCUMENTS

| 4,690,117 | A | * | 9/1987 | Isobe et al. | 123/492 |
| 5,020,748 | A | | 6/1991 | Okajima | |
| 5,081,975 | A | * | 1/1992 | Maebashi | 123/493 |
| 6,526,946 | B1 | * | 3/2003 | Kanno | 123/493 |
| 2005/0172933 | A1 | * | 8/2005 | Takeuchi et al. | 123/492 |
| 2005/0229907 | A1 | * | 10/2005 | Watanabe et al. | 123/493 |

FOREIGN PATENT DOCUMENTS

| JP | 55049543 A | * | 4/1980 | 123/325 |
| JP | 60169648 A | * | 9/1985 | 123/493 |
| JP | 04-081537 | | 3/1992 | |

* cited by examiner

*Primary Examiner*—Willis R. Wolfe, Jr.
(74) *Attorney, Agent, or Firm*—Nixon & Vanderhye PC

(57) ABSTRACT

An electronic control unit compulsorily stops supply of a fuel injection quantity, which is calculated based on various parameters including a throttle opening degree, performed by an injector in accordance with a crank angle signal if a series of operations, of rapidly opening a throttle valve from a certain throttle opening degree and then rapidly closing the throttle valve, occurs within a predetermined time in one combustion cycle of an internal combustion engine after completion of stroke determination. The electronic control unit removes the compulsory stoppage of the supply of the fuel injection quantity if drawing of an air intake quantity overlaps with at least one-third of an intake stroke in one combustion cycle of the engine.

20 Claims, 5 Drawing Sheets

FUEL INJECTION CONTROLLER OF ENGINE

CROSS REFERENCE TO RELATED APPLICATION

This application is based on and incorporates herein by reference Japanese Patent Application No. 2004-227042, filed on Aug. 3, 2004, and Japanese Patent Application No. 2005-119812 filed on Apr. 18, 2005.

BACKGROUND OF THE INVENTION

1. Field of the Invention

The present invention relates to a fuel injection controller of an internal combustion engine for calculating a fuel injection quantity in a combustion cycle based on a crank angle signal, which is detected in accordance with an angular position corresponding to rotation of a crankshaft of the engine, and for performing fuel injection control.

2. Description of Related Art

In an independent air intake internal combustion engine, a basic fuel injection quantity is set in accordance with an intake pressure, a throttle opening degree, an engine rotation speed or the like. A final fuel injection quantity is calculated by correcting the basic fuel injection quantity based on various parameters such as cooling water temperature, intake air temperature, atmospheric pressure or a gear position of a transmission. Fuel cutting control is also performed to change or cut the fuel injection quantity in accordance with various operation parameters such as engine rotation speed, vehicle speed, or a change in the throttle opening degree.

A technology related to the above scheme is described in JP-A-H04-81537, for example. In this technology, a fuel supply quantity is reduced from a steady-state value or cut for a predetermined time if deceleration is detected within a certain time after acceleration correction is performed.

If the processing ability of the CPU of an electronic control unit at the time when this technology was made is taken into consideration, then it would not have been possible for the above technology to consider the case where a series of operations, such as rapidly opening a throttle valve from a certain throttle opening degree and then rapidly closing the throttle valve, occurs in an extremely short time within one combustion cycle of the engine. Therefore, this technology cannot respond to an over-rich mixture condition, which can be caused by asynchronous fuel injection performed in accordance with the change in the throttle opening degree when the acceleration is required in the first stage by a driver and the throttle valve is rapidly opened. As a result, there is a possibility of reduction of engine rotation speed or engine stall.

However, in some cases, the over-rich mixture condition is not necessarily caused by the asynchronous fuel injection even in the case where the series of operations, namely, rapidly opening the throttle valve from a certain throttle opening degree and then rapidly closing the throttle valve, occurs in an extremely short time within a combustion cycle of the engine. There is also the possibility that an operating state of the engine is adversely affected if the fuel supply quantity is reduced or cut in a uniform manner.

SUMMARY OF THE INVENTION

It is therefore an object of the present invention to provide a fuel injection controller of an internal combustion engine capable of setting an optimum fuel injection quantity without adversely affecting an operating state of the engine even in the case where the series of operations, of rapidly opening a throttle valve from a certain throttle opening degree and then rapidly closing the throttle valve, occurs in an extremely short time within a combustion cycle of the engine.

According to one aspect of the present invention, a fuel injection controller of an internal combustion engine performs stroke determination based on a crank angle signal, which is detected by crank angle detector based on rotation of a crankshaft of the engine. The fuel injection controller calculates a fuel injection quantity based on various parameters including a throttle opening degree sensed by a throttle opening degree sensor. A fuel injection valve supplies the fuel injection quantity in accordance with the crank angle signal. The fuel injection controller compulsorily stops the supply of the fuel injection quantity to avoid an over-rich mixture condition if the series of operations, of rapidly opening a throttle valve from a certain throttle opening degree and of rapidly closing the throttle valve, occurs within a predetermined short time. The supply of the fuel injection quantity is necessary to maintain an operating state of the engine if drawing of an air intake quantity defined by the series of operations of the throttle valve overlaps with at least one-third of an intake stroke in one combustion cycle of the engine. Therefore, in such a case, the fuel injection controller removes the compulsory stoppage of the supply of the fuel injection quantity. Thus, suitable fuel injection quantity can be set to avoid an adverse effect on the operating state of the engine, even if the series of operations, of rapidly opening the throttle valve from a certain throttle opening degree and then rapidly closing the throttle valve, occurs in an extremely short time, shorter than one combustion cycle of the engine.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENT

Figure 1:
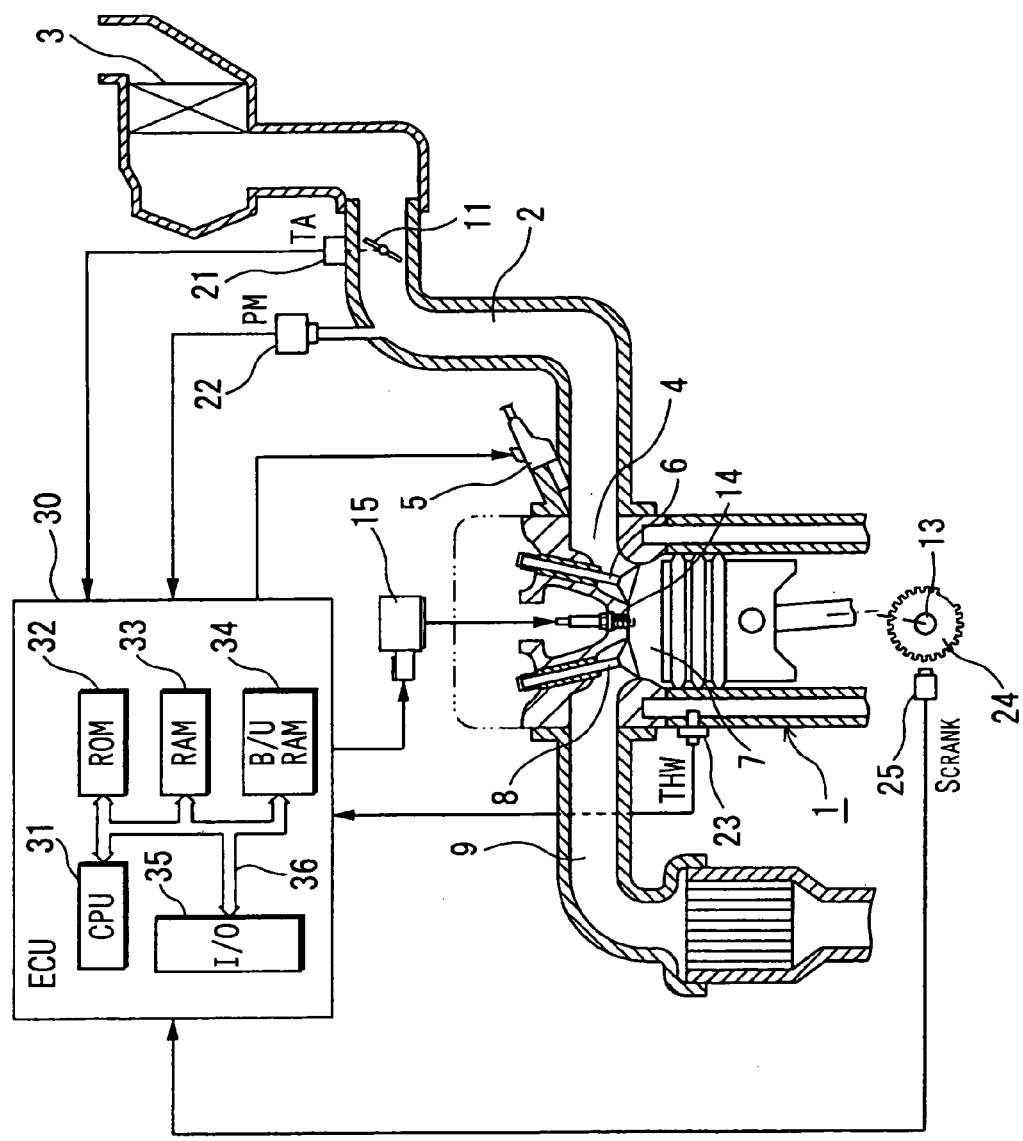
FIG. 1 is a schematic diagram showing a fuel injection controller applied to an internal combustion engine according to an embodiment of the present invention.

Referring to FIG. 1, a fuel injection controller applied to an internal combustion engine according to an example embodiment of the present invention is illustrated.

The engine 1 shown in FIG. 1 is a four-cycle single-cylinder engine. Air is introduced into an intake passage 2 of the engine 1 through an air cleaner 3. A throttle valve 11 is disposed in the intake passage 2. The throttle valve 11 is opened and closed in accordance with an accelerator manipulation amount or the like provided by a driver (operator). A quantity of the intake air drawn into the intake passage 2 is regulated by opening and closing the throttle valve 11. Fuel, which is pressure-fed by a fuel pump (not shown) from a fuel tank (not shown) and a pressure of which is regulated by a pressure regulator (not shown), is injected and supplied near an intake port 4 of the engine 1 by an injector (fuel injection valve) 5 disposed in the intake passage 2 in accordance with the air intake quantity. A mixture gas consisting of a predetermined quantity of the fuel and the air intake quantity is drawn into a combustion chamber 7 through an intake valve 6.

A throttle opening degree sensor 21 is disposed on the throttle valve 11 for sensing a throttle opening degree TA corresponding to the accelerator manipulation amount or the like. An intake pressure sensor 22 is disposed downstream of the throttle valve 11 for sensing an intake pressure PM in the intake passage 2. A water temperature sensor 23 is disposed on the engine 1 for sensing a cooling water temperature THW. A crank rotor 24 is fixed to a crankshaft 13 of the engine 1. A crank angle sensor 25 is provided for detecting a crank angle signal SCRANK produced in accordance with rotation of the crank rotor 24.

The crank rotor 24 has twenty four tooth positions at equal angles, and two consecutive positions out of the twenty four tooth positions lack teeth. Thus, the crank rotor 24 has twenty two teeth. The tooth position lacking the tooth can be determined from variation in pulse generation intervals of the crank angle signals SCRANK output by the crank angle sensor 25. An engine rotation speed NE of the engine 1 is calculated based on the pulse generation intervals of the crank angle signals SCRANK.

An ignition plug 14 is disposed to protrude into the combustion chamber 7 of the engine 1. A high voltage is applied to the ignition plug 14 by an ignition coil 15 based on an ignition command signal, which is output by an electronic control unit (ECU) 30 in synchronization with the crank angle signal SCRANK. Thus, the mixture gas in the combustion chamber 7 is ignited and combusted (expanded) to generate a driving force. Exhaust gas generated by the combustion is lead to an exhaust passage 9 through an exhaust valve 8 and an exhaust manifold, and is discharged to the outside.

The ECU 30 is a calculation circuit including CPU (central processing unit) 31, ROM 32, RAM 33, backup RAM (B/U RAM) 34, an input-output circuit 35, a bus line 36 and the like. The CPU 31 executes various types of calculation processing. The ROM 32 stores control programs, control maps and the like. The RAM 33 and the backup RAM 34 store various types of data. The bus line 36 connects these components of the ECU 30. The ECU 30 receives the throttle opening degree TA from the throttle opening sensor 21, the intake pressure PM from the intake pressure sensor 22, the cooling water temperature THW from the water temperature sensor 23, the crank angle signal SCRANK from the crank angle sensor 25, and the like.

Output signals from the ECU 30, based on the above various sensor signals, controls the injector 5 in regard to fuel injection timing and fuel injection quantity, the ignition plug 14 and the ignition coil 15 in regard to ignition timing, and the like.

Figure 2:
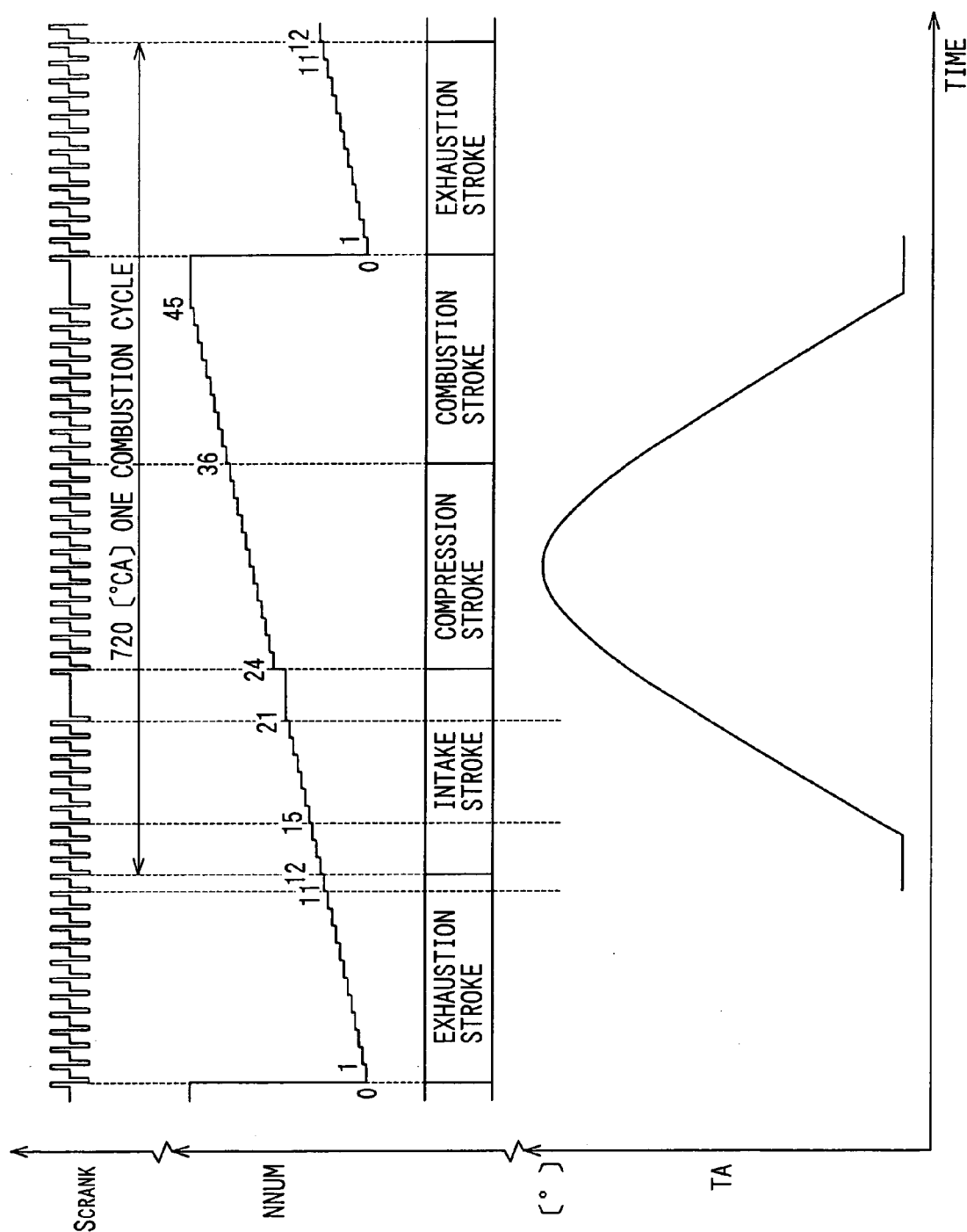
FIG. 2 is a time chart showing a transition of a throttle opening degree with respect to a crank angle signal counter position according to the embodiment.

Next, an example of a transition of the throttle opening degree TA (°) in the case where the throttle valve 11 is rapidly opened from a certain throttle opening degree and then rapidly closed will be explained based on the time chart shown in FIG. 2. In FIG. 2, the transition of the throttle opening degree TA is shown with a position of a crank angle signal counter (stroke position) NNUM after completion of stroke determination. The crank angle signal counter NNUM is provided in accordance with the generation of the crank angle signals SCRANK.

As shown in FIG. 2, a four-cycle combustion cycle of 720° C.A (crank angle) consists of an intake stroke, a compression stroke, a combustion stroke (expansion stroke) and an exhaustion stroke. In this example, the intake pressure PM sensed by the intake pressure sensor 22 substantially coincides with atmospheric pressure. A standard crank angle position along the rotational direction of the crankshaft 13 is determined when the crank angle signal SCRANK is generated for the first time after the tooth-lacking positions are detected at every combustion cycle of 720° C.A. The crank angle signal counter NNUM is set to zero at the standard crank angle position. The standard crank angle position is set at the start of the exhaustion stroke. It is determined that the stroke determination is completed at the standard crank angle position.

After the standard crank angle position is detected, the crank angle signal counter NNUM is incremented by one for every 15° C.A, at which one crank angle signal SCRANK is generated. The interval of the crank angle signals SCRANK across the tooth lacking positions is 45° C.A.

The stroke management is performed after the completion of the stroke determination. The exhaustion stroke is determined when the crank angle signal counter NNUM is 0 to 11, the intake stroke is determined when the crank angle signal counter NNUM is 12 to 21, the compression stroke is determined when the crank angle signal counter NNUM is 24 to 35, and the combustion stroke (expansion stroke) is determined when the crank angle signal counter NNUM is 36 to 45. The crank angle signal counter NNUM 22, 23, 46, 47 are missing numbers because two consecutive positions out of twenty four tooth positions of the crank rotor 24 are tooth-lacking positions.

Next, processing of fuel injection correction control in the fuel injection control performed by the CPU 31 of the ECU 30 used in an ignition controller of the engine 1 will be explained based on a flowchart shown in FIG. 3. The fuel injection correction control is performed for compulsorily stopping the supply of the fuel injection quantity, which is performed by the injector 5 in synchronous fuel injection control (explained hereinbelow) or asynchronous fuel injection control (explained hereinbelow), or for removing the compulsory stoppage of the supply of the fuel injection quantity in accordance with a series of operations of rapidly opening the throttle valve 11 from a certain opening degree TA and then rapidly closing the throttle valve 11 in one combustion cycle of the engine 1. The CPU 31 repeatedly performs the fuel injection correction control routine every 5 ms (milliseconds).

Figure 3:
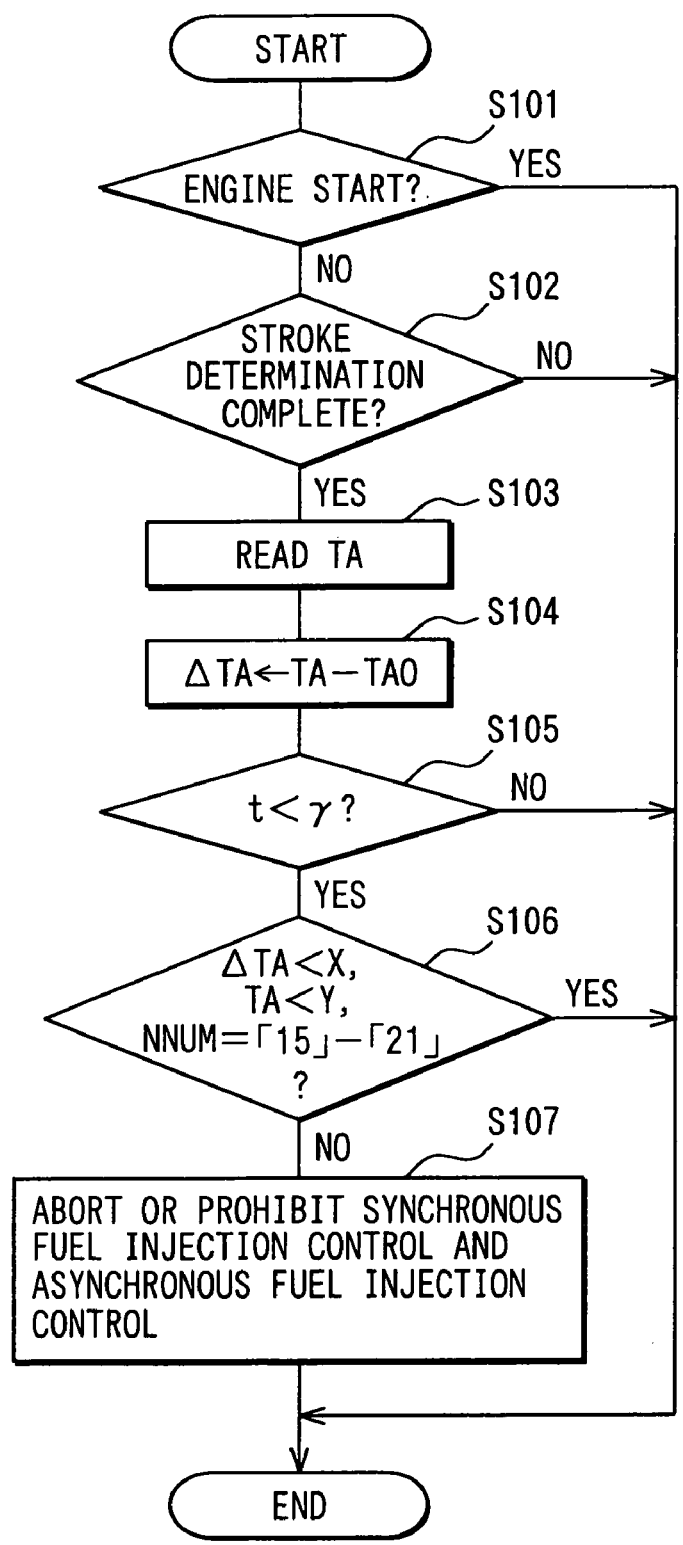
FIG. 3 is a flowchart showing processing of fuel injection correction control performed by the fuel injection controller according to the embodiment.

At Step S101 of the flowchart shown in FIG. 3, it is determined whether the engine 1 is being started or not. The routine is ended immediately if the result of the determination at Step S101 is YES, i.e., it is determined that the engine is being cranked and started. The processing proceeds to Step S102 if the result of the determination at Step S101 is NO, e.g., a predetermined time, e.g., 1520 ms, has passed after the completion of the start of the engine 1 and the start of the engine 1 has been completed. At step S102, it is determined whether the stroke determination is completed or not. The routine is ended immediately if the result of the determination at Step S102 is NO. Other preconditions of the determination at Step S102 include that the engine rotation speed NE is lower than a predetermined rotation speed, e.g., 1800 rpm and that the throttle opening degree sensor 21 is normal, for example.

If the result of the determination at Step S102 is YES, i.e., it is determined that the stroke determination is completed and all of the above preconditions are established, the processing proceeds to Step S103 and the throttle opening degree TA is read. Then, the processing proceeds to Step S104 and a difference between the present throttle opening degree TA and the previous throttle opening degree TAO (the throttle opening degree TA sensed 5 ms before the sensing of the present value) is calculated as a throttle opening degree change $\Delta TA$.

The processing next proceeds to Step S105 and it is determined whether an elapsed time t is less than a predetermined time $\gamma$ (ms), where t is the time elapsed since the time at which $\Delta TA > \alpha$ and $TA > \beta$, where $\alpha$ is a predetermined throttle opening degree change (°/ms) and $\beta$ is a predetermined throttle opening degree (°). For example, it is determined whether the time t elapsed since the time at which the throttle opening degree change $\Delta TA$ exceeds 0.490 in 5 ms, or inclination of rising of the throttle opening degree TA is greater than 0.098°/ms, and the throttle opening degree TA exceeds 44.92° is less than 100 ms.

It is determined that the throttle valve 11 is being opened rapidly if the throttle opening degree change $\Delta TA$ exceeds 0.098°/ms. It is determined that the throttle valve 11 has been moved largely along an opening direction if the throttle opening degree TA exceeds 44.92°. It is determined that this movement has just occurred if the elapsed time since the establishment of these conditions is within 100 ms. If the result of the determination at Step S105 is YES, the processing proceeds to Step S106.

The routine is ended immediately if the result of the determination at Step S105 is NO, or if the throttle opening degree change $\Delta TA$ is equal to or less than the predetermined throttle opening degree change $\alpha$ (°/ms), or the throttle opening degree TA is equal to or less than the predetermined throttle opening degree $\beta$ so that both conditions are not established or if the elapsed time t after the timing, at which the throttle opening degree change $\Delta TA$ exceeds the predetermined throttle opening degree change $\alpha$ (°/ms) and the throttle opening degree TA exceeds the predetermined throttle opening degree $\beta$ (°), is longer than the predetermined time $\gamma$ (ms).

At Step S106, it is determined whether the throttle opening degree change $\Delta TA$ calculated at Step S104 is less than a predetermined throttle opening degree change X (°/ms), whether the throttle opening degree TA read at Step S103 is less than a predetermined throttle opening degree Y and whether the crank angle signal counter NNUM is in a range from 15 to 21. For example, it is determined whether the throttle opening degree change $\Delta TA$ in 5 ms is less than −0.49°/ms, or declination of falling edge of the throttle opening degree TA is less than −0.098°/ms, whether the throttle opening degree Y is less than 43.95°, and whether the crank angle signal counter NNUM is in the range from 15 to 21.

The routine is ended immediately if the result of the determination at Step S106 is YES, i.e., the throttle valve 11 is being closed rapidly so that the throttle opening degree change $\Delta TA$ is less than −0.098°/ms, the throttle valve 11 is closed largely so that the throttle opening degree TA is less than 43.95°, and the crank angle signal counter NNUM is in the range from 15 to 21. Thus, the fuel injection is continued without aborting or prohibiting the synchronous fuel injection control and the asynchronous fuel injection control.

The processing proceeds to Step S107 if the determination conditions are not established at Step S106, i.e., the throttle opening degree change $\Delta TA$ is equal to or greater than the predetermined throttle opening degree change X (°/ms), the throttle opening degree TA is equal to or greater than the predetermined throttle opening degree Y (°), or the crank angle signal counter NNUM is out of the range from 15 to 21. At Step S107, the synchronous fuel injection control and asynchronous fuel injection control are aborted or prohibited, and the routine is ended.

The range of the crank angle signal counter NNUM from 15 to 21 substantially coincides with a period from the end of the first one-third of the intake stroke to the end of the intake stroke as shown in the time chart of FIG. 2.

In this example embodiment, if the timing at which the throttle valve 11 is rapidly closed is in the range of the crank angle signal counter NNUM from 15 to 21, i.e., the result of the determination at Step S106 is YES, in the series of operations, e.g., rapidly opening the throttle valve 11 from the certain throttle opening degree and then rapidly closing the throttle valve 11, it is assumed that the drawing of the intake quantity provided by the series of operations of the throttle valve 11 overlaps with at least one third of the intake stroke within one combustion cycle of the engine. For example, in the series of operations of the throttle valve 11, the throttle opening degree change $\Delta TA$ becomes less than the predetermined throttle opening degree change X and the throttle opening degree TA becomes less than the predetermined opening degree Y within the predetermined time $\gamma$ after the rapid opening operation of the throttle valve 11 occurred (wherein the throttle opening degree TA exceeded the predetermined throttle opening degree $\beta$ and the throttle opening degree changed $\Delta TA$ exceeds the predetermined throttle opening degree change $\alpha$).

As shown by the flowchart of FIG. 3, if the series of operations, namely, rapidly opening the throttle valve 11 from the certain throttle opening degree and then rapidly closing the throttle valve 11, occurs within the predetermined time $\gamma$ and the crank angle signal counter NNUM is out of the range from 15 to 21, the series of operations of the throttle valve 11 does not overlap with the intake stroke so much. In such a case, it is assumed that the intake air is not substantially drawn into the combustion chamber 7. Therefore, the processing proceeds to Step S107 and aborts or prohibits the synchronous and asynchronous fuel injection. If the series of operations of the throttle valve 11 is performed and the end timing of the rapidly closing operation of the throttle valve 11 is in the period from the end of the first one-third of the intake stroke to the end of the intake stroke (the crank angle signal counter NNUM is in the range from 15 to 21), the determination at Step S106 is established. In this case, the routine is ended immediately. The series of operations of the throttle valve 11 overlaps with the intake stroke. Therefore, it is assumed that extra air is drawn into the combustion chamber 7. In this case, the compulsory stoppage of the synchronous and asynchronous fuel injection at Step S107 is skipped to continue the fuel injection.

Next, processing of the synchronous fuel injection control in the fuel injection control, which is executed by the CPU 31 of the ECU 30 used in the ignition controller of the engine 1 according to this example embodiment, will be explained based on the flowchart shown in FIG. 4. This synchronous fuel injection control routine is repeatedly executed by the CPU 31 when the crank angle signal counter NNUM is around 36 in every 720° C.A shown in FIG. 2.

Figure 4:
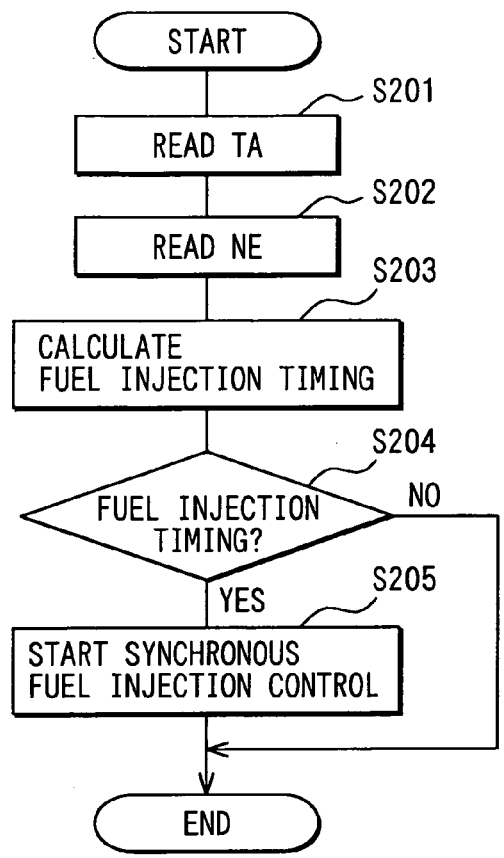
FIG. 4 is a flowchart showing processing of synchronous fuel injection control in the fuel injection correction control according to the embodiment.

The throttle opening degree TA is read at Step S201 of the flowchart shown in FIG. 4. Then, at Step S202, the engine rotation speed NE is read based on the pulse generation intervals of the crank angle signals SCRANK detected by the crank angle sensor 25. Next, at Step S203, fuel injection timing is calculated based on a fuel injection timing map by using the throttle opening degree TA (Step S201) and the engine rotation speed NE (Step S202) as parameters.

At Step S204, it is determined whether the fuel injection timing calculated at Step S203 has been reached. If the result of the determination at Step S204 is YES, the synchronous fuel injection control is started at Step S205. If the result of the determination at Step S204 is NO, the routine is ended immediately.

In the synchronous fuel injection control, a basic fuel injection quantity is set from the intake pressure PM, the throttle opening degree TA and the engine rotation speed NE at the time by a routine (not shown). Then, the basic fuel injection quantity is corrected based on various parameters such as the cooling water temperature THW, the intake air temperature, the atmospheric pressure or the gear position of the transmission to calculate the fuel injection quantity.

Next, processing of the asynchronous fuel injection control in the fuel injection control, which is executed by the CPU 31 of the ECU 30 used in the ignition controller of the engine 1 according to this embodiment, will be explained based on the flowchart shown in FIG. 5. This asynchronous fuel injection control is repeatedly executed every 5 ms by the CPU 31.

Figure 5:
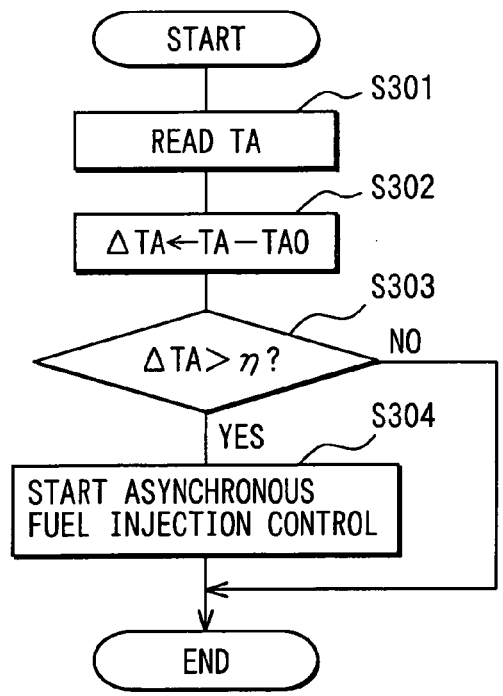
FIG. 5 is a flowchart showing processing of asynchronous fuel injection control in the fuel injection correction control according to the embodiment.

The throttle opening degree TA is input at Step S301 of the flowchart shown in FIG. 5. Then, at Step S302, a difference between the present throttle opening degree TA and a previous throttle opening degree TAO, from 5 ms before, is calculated as a throttle opening degree change ΔTA. At Step S303, it is determined whether the throttle opening degree change ΔTA is greater than a predetermined throttle opening degree change η (°/ms).

If the result of the determination at Step S303 is YES, it is determined that a fuel injection quantity in an asynchronous time has to be supplied from the injector 5 in response to operation of rapidly opening the throttle valve 11 from a certain throttle opening degree TA in one combustion cycle of the engine 1. Accordingly, the asynchronous fuel injection control is started at Step S304. If the result of the determination at Step S303 is NO, the routine is ended immediately.

In the asynchronous fuel injection control, the fuel injection quantity in the asynchronous time is set based on the engine rotation speed NE at the time. Then, the fuel injection quantity in the asynchronous time is corrected based on various parameters such as the throttle opening degree change ΔTA, the cooling water temperature THW or the intake air temperature at the time to calculate the final fuel injection quantity in the asynchronous time.

As explained above, the fuel injection controller of the engine 1 according to this example embodiment includes the throttle opening degree sensor 21, the crank angle sensor 25, and the ECU 30. The throttle opening degree sensor 21 is disposed in the intake passage 2 of the engine 1 for sensing the throttle opening degree TA of the throttle valve 11. The crank angle sensor 25 detects the crank angle signal SCRANK corresponding to the rotation of the crankshaft 13 of the engine 1. The ECU 30 performs the stroke determination for determining the stroke based on the crank angle signal SCRANK detected by the crank angle sensor 25. The ECU 30 performs the fuel injection control for making the injector 5 disposed in the intake passage 2 of the engine 1 supply the fuel injection quantity, which is calculated based on the various parameters such as the throttle opening degree TA or the engine rotation speed NE, in accordance with the crank angle signal SCRANK in one combustion cycle of the engine 1 defined by the stroke determination. The ECU 30 performs the fuel injection correction control for aborting or prohibiting the synchronous fuel injection control and the asynchronous fuel injection control to compulsorily stop the supply of the fuel injection quantity performed in the fuel injection control when the series of operations, of rapidly opening the throttle valve 11 from a certain opening degree and then rapidly closing the throttle valve 11, occurs within a predetermined time in one combustion cycle of the engine 1 defined by the stroke determination. In the fuel injection correction control, the ECU 30 removes the compulsory stoppage of the supply of the fuel injection quantity, which is performed in the fuel injection control, if the drawing of the air intake quantity defined by the series of operations of the throttle valve 11 overlaps with at least one-third of the intake stroke in one combustion cycle of the engine 1. In the fuel injection correction control, it is determined that the throttle valve 11 is rapidly opened or closed if an absolute value of the throttle opening degree change ΔTA in the series of operations of the throttle valve 11 is equal to or greater than 0.098°/ms. The engine 1 is a four-cycle single-cylinder engine.

The supply of the fuel injection quantity, which is calculated from the various parameters including the throttle opening degree TA, performed by the injector 5 in accordance with the crank angle signal SCRANK is compulsorily stopped if the absolute value of the throttle opening degree change ΔTA, at the time when the throttle valve 11 is opened or closed from a certain throttle opening degree, is equal to or greater than 0.098°/ms in one combustion cycle of the engine 1 after the completion of the stroke determination and if the series of operations, in which the throttle valve 11 is determined to be rapidly opened and then rapidly closed, occurs within a predetermined time.

The compulsory stoppage of the supply of the fuel injection quantity from the injector 5 is not executed uniformly. In the case where drawing of the air intake quantity defined by the series of operations of the throttle valve 11 overlaps with at least one-third of the intake stroke in one combustion cycle of the engine 1, the gas mixture at a certain air-fuel ratio is introduced into the cylinder and is necessary to maintain the operating state of the engine 1. Therefore, in such a case, the compulsory stoppage of the supply of the fuel injection quantity is removed.

Out of the intake stroke, the compression stroke, the combustion stroke (expansion stroke) and the exhaustion stroke of one combustion cycle of the engine 1, the stroke that occurs when the series of operations of the throttle valve 11 occurs is set in accordance with the crank angle signal counter NNUM through adjustment in the equipment itself. A ratio of the drawing time of the air intake quantity to the intake stroke is also set in accordance with the crank angle signal counter NNUM through the adjustment in the equipment. As explained above, in this example embodiment, it is assumed that the drawing of the intake air quantity overlaps with at least one-third of the intake stroke within one combustion cycle if the end timing of the series of operations of the throttle valve 11 is in the range of the crank angle signal counter NNUM from 15 to 21.

The compulsory stoppage of the supply of the fuel injection quantity, or the removal of the compulsory stoppage, is set in consideration of the influence on the engine 1 every time the series of operations of the throttle valve 11 occurs within a predetermined time. Thus, the fuel injection quantity is suitably corrected. As a result, the operating state of the engine 1 can be suitably maintained.

The ECU 30 performs the fuel injection correction control if the series of operations, of rapidly opening the throttle valve 11 and then rapidly closing the throttle valve 11, occurs within an extremely short time of 100 ms in one combustion cycle of the engine 1, if the throttle valve 11 is rapidly closed in the series of the operations of the throttle valve 11, and if the throttle opening degree is less than a predetermined throttle opening degree. Therefore, the fuel injection correction control can be suitably performed when there is a possibility of an adverse effect on the operating state of the engine 1.

If the series of operations of rapidly opening and then rapidly closing the throttle valve 11 has ended in the first one-third of the intake stroke, it is assumed that the intake air quantity taken into the combustion chamber 7 has not been substantially increased by the series of the operations of the throttle valve 11. In this case, the synchronous fuel injection control and the asynchronous fuel injection control are aborted or prohibited to compulsorily stop the supply of the fuel injection quantity. If the series of operations of rapidly opening and then rapidly closing the throttle valve 11 has ended after the first one-third of the intake stroke, it is assumed that the intake air quantity taken into the combustion chamber 7 has been increased by the series of the operations of the throttle valve 11. In this case, the compulsory stoppage of the supply of the fuel injection quantity is removed to continue the fuel injection.

Thus, the fuel injection quantity can be controlled in accordance with the actual air quantity drawn into the cylinder, even if the opening degree of the throttle valve 11 is rapidly changed in an extremely short time within one combustion cycle. Thus, the problem of an over-rich mixture condition or the like is resolved, and an adverse effect on the operating state of the engine 1 can be inhibited.

Next, a modified example of the processing of the fuel injection correction control in the fuel injection control performed by the CPU 31 of the ECU 30 used in the fuel injection controller of the engine 1 will be explained based on the flowchart shown in FIG. 6. The routine shown in FIG. 6 is repeatedly performed every 5 ms by the CPU 31.

Figure 6:
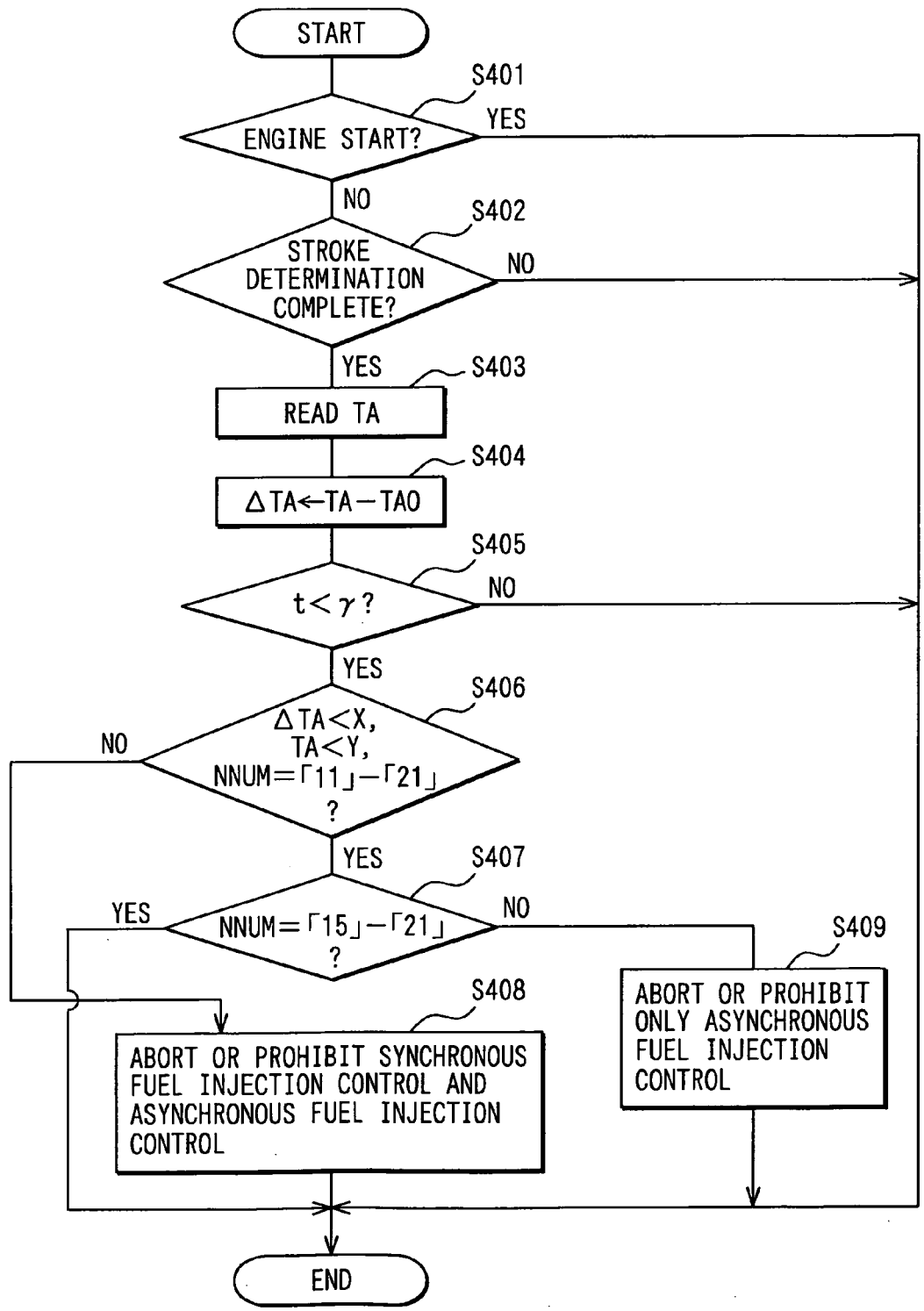
FIG. 6 is a flowchart showing processing of fuel injection correction control in fuel injection control performed by a fuel injection controller of an internal combustion engine of a modified example of the embodiment.

Steps S401 to S405 of the flowchart shown in FIG. 6 correspond to Steps S101 to S105 of the flowchart shown in FIG. 3. At Step S406, it is determined whether the throttle opening degree change ΔTA calculated at Step S404 is less than a predetermined throttle opening degree change X (°/ms) and whether the throttle opening degree TA read at Step S403 is less than a predetermined throttle opening degree Y. Meanwhile, at step S406, it is determined whether the crank angle signal counter NNUM is in the range from 11 to 21, i.e., the intake stroke occurs. If the result of the determination at Step S406 is YES, the processing proceeds to Step S407, where it is determined whether the crank angle signal counter NNUM is in a range from 15 to 21.

If the result of the determination at Step S406 is NO, it is assumed that the series of operations of rapidly opening and then rapidly closing the throttle valve 11 within the predetermined time does not cause the drawing of the air into the combustion chamber 7 even when the series of operations occurs. In this case, the processing proceeds to Step S408, where the synchronous fuel injection control and the asynchronous fuel injection control are aborted or prohibited as the fuel injection correction control, and then, the routine is ended.

If the result of the determination at Step S407 is NO, the processing proceeds to Step S409, where only the asynchronous fuel injection control is aborted or prohibited, and then, the routine is ended.

If the result of the determination at Step S407 is YES even once, the routine is ended immediately. In this case, the series of operations of the throttle valve 11 overlaps with the intake stroke, so it is assumed that additional air is drawn into the combustion chamber 7. Therefore, the compulsory stoppage of the synchronous and asynchronous fuel injection is not executed, but the fuel injection is continued.

In the case where the result of the determination at Step S407 is NO, the end timing of the series of operations of the throttle valve 11 is in the first one-third of the intake stroke. In this case, some quantity of air enters the combustion chamber 7. Therefore, the asynchronous fuel injection control is aborted or prohibited but it is determined that the synchronous fuel injection control should not be necessarily aborted or prohibited in addition to the asynchronous fuel injection control at this fuel injection timing. Therefore, only the asynchronous fuel injection control is aborted or prohibited at Step S409.

The fuel injection controller of the engine 1 of the modified example includes, referring to FIG. 1, the throttle opening degree sensor 21, the crank angle sensor 25, and the ECU 30. The throttle opening degree sensor 21 is disposed in the intake passage 2 of the engine 1 for sensing the throttle opening degree TA of the throttle valve 11. The crank angle sensor 25 detects the crank angle signal SCRANK corresponding to the rotation of the crankshaft 13 of the engine 1. The ECU 30 performs the stroke determination for determining the stroke based on the crank angle signal SCRANK detected by the crank angle sensor 25. The ECU 30 performs the fuel injection control for making the injector 5 disposed in the intake passage 2 of the engine 1 supply the fuel injection quantity, which is calculated based on the various parameters such as the throttle opening degree TA or the engine rotation speed NE, in accordance with the crank angle signal SCRANK in one combustion cycle of the engine 1 defined by the stroke determination. The ECU 30 performs the fuel injection correction control for aborting or prohibiting the synchronous fuel injection control and the asynchronous fuel injection control, or only the asynchronous fuel injection control, to compulsorily stop the supply of the fuel injection quantity performed in the fuel injection control when the series of operations, of rapidly opening the throttle valve 11 from a certain opening degree and then rapidly closing the throttle valve 11, occurs within a predetermined time in one combustion cycle of the engine 1 defined by the stroke determination. In the fuel injection correction control, the ECU 30 removes the compulsory stoppage of the supply of the fuel injection quantity, which is performed in the fuel injection control, if the drawing of the air intake quantity defined by the series of operations of the throttle valve 11 overlaps with at least one-third of the intake stroke in one combustion cycle of the engine 1.

Thus, the fuel injection controller of the engine 1 of the modified example compulsorily stops the supply of the fuel injection quantity, which is calculated from the various parameters including the throttle opening degree TA, performed by the injector 5 in accordance with the crank angle signal SCRANK if the series of operations, of rapidly opening the throttle valve 11 from a certain opening degree and then rapidly closing the throttle valve 11, occurs within a predetermined time in one combustion cycle after the completion of the stroke determination of the engine 1.

The compulsory stoppage of the supply of the fuel injection quantity from the injector 5 is not executed uniformly. In the case where drawing of the air intake quantity defined by the series of operations of the throttle valve 11 overlaps with at least one-third of the intake stroke in one combustion cycle of the engine 1, the gas mixture at a certain air-fuel ratio is introduced into the cylinder and is necessary to maintain the operating state of the engine 1. Therefore, in such a case, the compulsory stoppage of the supply of the fuel injection quantity is not executed.

Every time the series of operations of the throttle valve 11 occurs within a predetermined time, only the asynchronous fuel injection is aborted or prohibited but the synchronous fuel injection is performed if the end timing of the series of operations is in the first one-third of the intake stroke. The asynchronous and synchronous fuel injections are performed, i.e., the compulsory stoppage of the asynchronous and synchronous fuel injections are not executed, if the end timing of the series of operations of the throttle valve 11 is between the end of the first one-third of the intake stroke and the end of the intake stroke. Even in the case where the series of operations of the throttle valve 11 occurs, the synchronous and asynchronous fuel injections are stopped compulsorily if the series of operations is out of the intake stroke. Thus, the compulsory stoppage of the supply of the fuel injection quantity or the removal of the compulsory stoppage in the fuel injection correction control in the fuel injection control is determined in accordance with whether the fuel injection control is the synchronous fuel injection control or the asynchronous fuel injection control. The compulsory stoppage and the removal of the compulsory stoppage are set in consideration of the influence on the engine 1. As a result, the fuel injection quantity is corrected finely and suitably, and the operating state of the engine 1 is maintained suitably.

The present invention may be applied to an independent-air-intake four-cycle multi-cylinder engine having multiple cylinders that draw air independently. Functions and effects similar to the above example embodiments can also be exerted by performing similar fuel injection correction control for each cylinder of the independent-air-intake four-cycle multi-cylinder engine.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection controller of an internal combustion engine, the fuel injection controller comprising:
   opening degree sensor for sensing a throttle opening degree of a throttle valve disposed in an intake passage of the engine;
   crank angle sensor for detecting a crank angle signal corresponding to rotation of a crankshaft of the engine;
   stroke determining means for determining a stroke of the engine based on the crank angle signal detected by the crank angle sensor;
   injection controlling means for making a fuel injection valve supply a fuel injection quantity, which is calculated based on parameters including at least one of the throttle opening degree, a change in the throttle opening degree with time, intake pressure, engine rotation speed, engine cooling water temperature, intake air temperature, atmospheric pressure or a gear position of a transmission, in accordance with the crank angle signal in one combustion cycle of the engine, the fuel injection valve being disposed in the intake passage of the engine; and
   injection correcting means for compulsorily stopping the supply of the fuel injection quantity performed by the injection controlling means if at least one series of operations, of rapidly opening the throttle valve from a certain throttle opening degree and then rapidly closing the throttle valve, occurs within a predetermined time in one combustion cycle of the engine defined by the stroke determining means, and if drawing of an intake quantity of air defined by the series of operations of the throttle valve overlaps with less than one-third of the intake stroke in one combustion cycle of the engine.

2. The fuel injection controller as in claim 1, wherein the injection correcting means determines that the throttle valve is rapidly opened or rapidly closed if an absolute value of the change of the throttle opening degree defined by said series of operations of the throttle valve is equal to or greater than 0.098 degree per millisecond.

3. The fuel injection controller as in claim 1, wherein the injection correcting means compulsorily stops the supply of the fuel injection quantity if said series of operations of the throttle valve occurs within 100 milliseconds.

4. The fuel injection controller as in claim 1, wherein the injection correcting means compulsorily stops the supply of the fuel injection quantity if the throttle valve is rapidly closed and the throttle opening degree is less than a given throttle opening degree in the series of operations of the throttle valve.

5. The fuel injection controller as in claim 1, wherein the engine is a four-cycle single-cylinder engine or an independent-air-intake four-cycle multi-cylinder engine having multiple cylinders that draw air independently.

6. A method for controlling fuel injection of an internal combustion engine, the method comprising:
   determining a stroke of the engine based on a crank angle signal detected by a crank angle sensor;
   supplying a fuel injection quantity, which is calculated based on parameters including at least one of a throttle opening degree, a change of the throttle opening degree, intake pressure, engine rotation speed, engine cooling water temperature, intake air temperature, atmospheric pressure or a gear position of a transmission, in accordance with the crank angle signal;
   stopping the supply of the fuel injection quantity if at least one series of operations, of rapidly opening a throttle valve from a certain throttle opening degree and then rapidly closing the throttle valve, occurs within a predetermined time in one combustion cycle of the engine defined by determining the stroke, and if drawing of an intake quantity of air defined by the series of operations of the throttle valve overlaps with less than one-third of the intake stroke in one combustion cycle of the engine.

7. The method as in claim 6, wherein it is determined that the overlap is less than one-third of the intake stroke if an end timing of said series of operations is not in a final two-thirds of the intake stroke.

8. The method as in claim 6, wherein it is determined that the throttle valve is rapidly opened or rapidly closed if an absolute value of the change of the throttle opening degree defined by said series of operations of the throttle valve is equal to or greater than 0.098 degree per millisecond.

9. The method as in claim 6, wherein the supply of the fuel injection quantity is stopped if said series of operations of the throttle valve occurs within 100 milliseconds.

10. The method as in claim 6, wherein the supply of the fuel injection quantity is stopped if the throttle valve is rapidly closed and the throttle opening degree is less than a given throttle opening degree in said series of operations of the throttle valve.

11. The method as in claim 6, wherein the engine is a four-cycle single-cylinder engine or an independent-air-intake four-cycle multi-cylinder engine having multiple cylinders that draw air independently.

12. A fuel injection controller of an internal combustion engine, the fuel injection controller comprising:

opening degree sensor for sensing a throttle opening degree of a throttle valve disposed in an intake passage of the engine;

crank angle sensor for detecting a crank angle signal corresponding to rotation of a crankshaft of the engine;

stroke determining means for determining a stroke of the engine based on the crank angle signal;

synchronous injection controlling means for performing synchronous fuel injection of a fuel injection quantity, which is calculated based on parameters including at least one of the throttle opening degree, intake pressure, engine rotation speed, engine cooling water temperature, intake air temperature, atmospheric pressure or a gear position of a transmission, at fuel injection timing calculated based on an injection timing map;

asynchronous injection controlling means for performing asynchronous fuel injection of a fuel injection quantity, which is calculated based on parameters including at least one of a change of the throttle opening degree, the engine rotation speed, the cooling water temperature or the intake air temperature, if the change of the throttle opening degree exceeds a predetermined value; and injection correcting means for (1) compulsorily stopping the synchronous and asynchronous fuel injections if at least one series of operations, of rapidly opening the throttle valve from a certain throttle opening degree and then rapidly closing the throttle valve, occurs within a predetermined time in one combustion cycle of the engine defined by the stroke determining means and if the drawing of the intake quantity of air defined by the series of operations of the throttle valve does not overlap with the intake stroke, and (2) compulsorily stopping only the asynchronous fuel injection if at least one series of operations, of rapidly opening the throttle valve from a certain throttle opening degree and then rapidly closing the throttle valve, occurs within a predetermined time in one combustion cycle of the engine defined by the stroke determining means and if the drawing of the intake quantity of air defined by the series of operations of the throttle valve overlaps with at least a part of the intake stroke, but overlaps with less than one-third of the intake stroke.

13. The fuel injection controller as in claim 12, wherein the injection correcting means determines that the throttle valve is rapidly opened or rapidly closed if an absolute value of the change of the throttle opening degree defined by the series of operations of the throttle valve is equal to or greater than 0.098 degree per millisecond.

14. The fuel injection controller as in claim 12, wherein the injection correcting means compulsorily stops the synchronous and asynchronous fuel injections if the series of operations of the throttle valve occurs within 100 milliseconds.

15. The fuel injection controller as in claim 12, wherein the injection correcting means compulsorily stops the synchronous and asynchronous fuel injections if the throttle valve is rapidly closed and the throttle opening degree is less than a given throttle opening degree in the series of operations of the throttle valve.

16. A method for controlling fuel injection of an internal combustion engine, the method comprising:

determining a stroke of the engine based on a crank angle signal detected by a crank angle sensor;

selectively performing synchronous fuel injection of a fuel injection quantity, which is calculated based on parameters including at least one of the throttle opening degree, intake pressure, engine rotation speed, engine cooling water temperature, intake air temperature, atmospheric pressure or a gear position of a transmission, at fuel injection timing calculated based on an injection timing map;

selectively performing asynchronous fuel injection of a fuel injection quantity, which is calculated based on parameters including at least one of a change of the throttle opening degree, the engine rotation speed, the cooling water temperature or the intake air temperature, if the change of the throttle opening degree exceeds a predetermined value;

stopping the synchronous and asynchronous fuel injections if a series of operations, of rapidly opening the throttle valve from a certain throttle opening degree and then rapidly closing the throttle valve, occurs within a predetermined time in one combustion cycle of the engine defined by the stroke determining means and if the drawing of the intake quantity of air defined by the series of operations of the throttle valve does not overlap with the intake stroke; and stopping only the asynchronous fuel injections if a series of operations, of rapidly opening the throttle valve from a certain throttle opening degree and then rapidly closing the throttle valve, occurs within a predetermined time in one combustion cycle of the engine defined by the stroke determining means and if the drawing of the intake quantity of air defined by the series of operations of the throttle valve overlaps with at least a part of the intake stroke, but overlaps with less than one-third of the intake stroke.

17. The method as in claim 16, wherein it is determined that the overlap is less than one-third of the intake stroke if an end timing of said series of operations is not in a final two-thirds of the intake stroke.

18. The method as in claim 16, wherein it is determined that the throttle valve is rapidly opened or rapidly closed if an absolute value of the change of the throttle opening degree defined by the series of operations of the throttle valve is equal to or greater than 0.098 degree per millisecond.

19. The method as in claim 16, wherein
the synchronous and asynchronous fuel injections are stopped if the series of operations of the throttle valve occurs within 100 milliseconds.

20. The method as in claim 16, wherein
the synchronous and asynchronous fuel injections are stopped if the throttle valve is rapidly closed and the throttle opening degree is less than a given throttle opening degree in the series of operations of the throttle valve.

* * * * *